UNITED STATES PATENT OFFICE.

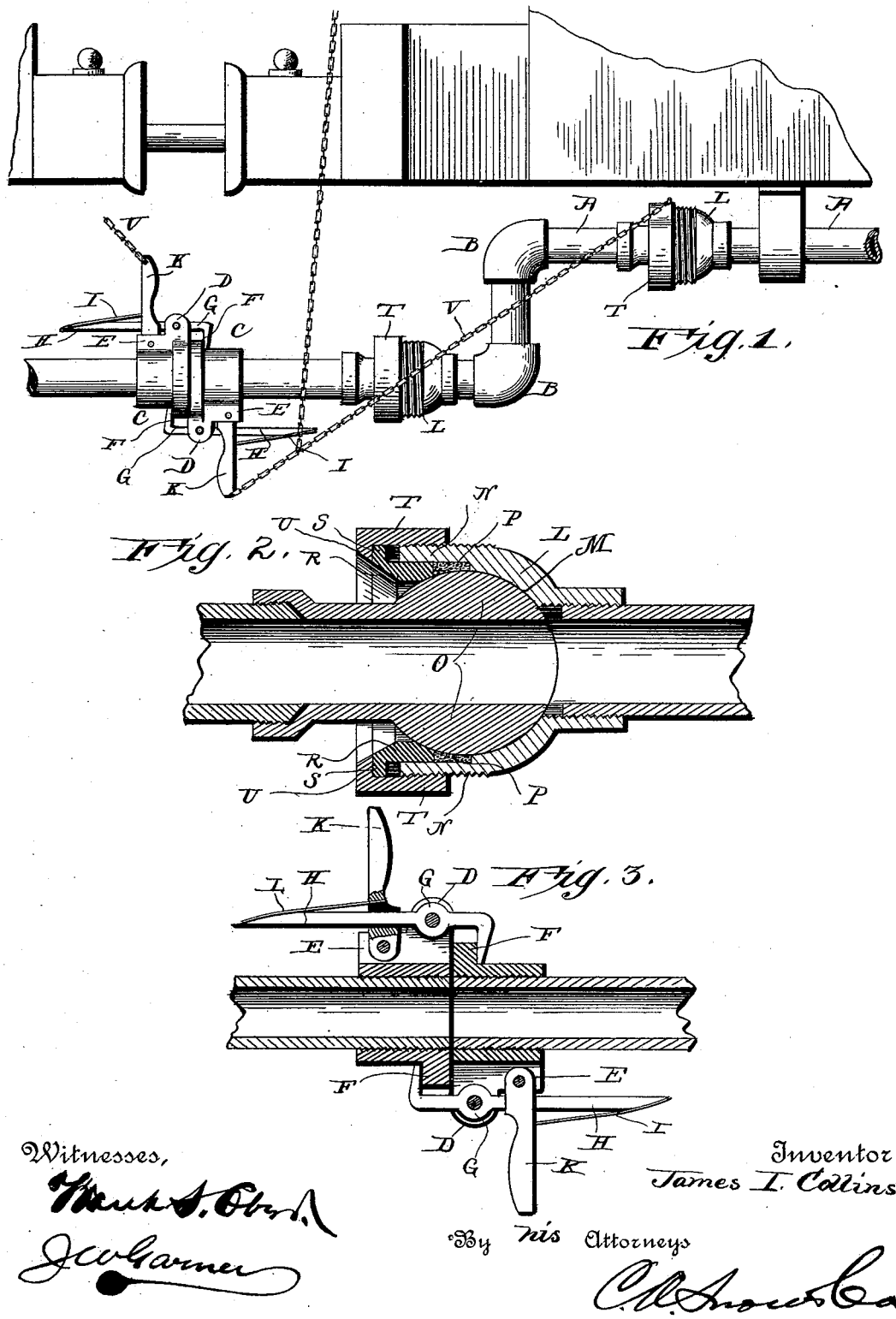

JAMES I. COLLINS, OF AMSTERDAM, NEW YORK.

PIPE-COUPLING.

SPECIFICATION forming part of Letters Patent No. 403,916, dated May 28, 1889.

Application filed December 6, 1888. Serial No. 292,773. (No model.)

*To all whom it may concern:*

Be it known that I, JAMES I. COLLINS, a citizen of the United States, residing at Amsterdam, in the county of Montgomery and State of New York, have invented a new and useful Improvement in Pipe-Couplings, of which the following is a specification.

My invention relates to an improvement in pipe-couplings for connecting air, steam, and water pipes between railroad-cars; and it consists in the peculiar construction and combination of devices, that will be more fully set forth hereinafter, and particularly pointed out in the claims.

In the accompanying drawings, Figure 1 is an elevation, partly in section, of a pipe-coupling embodying my improvements. Fig. 2 is a detail sectional view of one of the ball-and-socket joints. Fig. 3 is a similar view of the joint between the cars.

The air or steam pipes A, secured under the cars in the usual or any suitable manner, are each provided with a pair of quarter-circular couplings, B, whereby the said pipes are bent at right angles, and the meeting ends of said pipes are provided with coupling members C, each of which is provided on one side with two pairs of ears, D E, arranged one behind the other, and said coupling members having the annular projecting flanges F at their meeting ends. Pivoted between each pair of ears D is a hook, G, adapted to engage the opposing flange F, the said hooks having rearwardly-extending arms H, on which are secured springs I. Pivoted between each pair of ears E is the lower end of a lever, K, the said levers being provided with openings, through which the arms H extend and against the upper sides of which the free ends of the springs I are caused to bear. By depressing the levers K the same are caused to bear downward on the springs I, and thereby trip the hooks G from the flanges F in such manner as to disconnect the pipes between the cars, as will be very readily understood.

In order to enable the pipes A to accommodate themselves to the motion of the cars, I provide each of said pipes with a pair of ball-and-socket joints, the construction of which is as follows: A case or shell, L, is screwed to one member of the pipe A and has a concavity, M, formed therein, and is provided with an outwardly-projecting flange, N, the same being exteriorly screw-threaded. The opposing member of the pipe A is provided with a ball or sphere, O, which is interiorly bored to provide an unobstructed passage through the pipe, and the said ball or sphere engages the concavity M and forms a ground-joint therewith. A suitable quantity of packing-material, P, is introduced in the space between the flange N and the ball, and a gland, R, having a flange, S, at its outer edge, is inserted within the flange N and caused to bear against the packing. A sleeve, T, having an interior thread, is screwed on the flange N, and is provided at its outer edge with an inwardly-extending annular flange, U, which bears against the flange S of the gland and forces the latter against the packing material so tightly as to effectually pack the joint and render the same steam and air tight. These ball-and-socket joints serve to separate each pipe A into three members or parts and to permit independent universal motion of the said parts, and thereby enable the pipes A to accommodate themselves to the motion of the cars under any and all circumstances, as will be very readily understood.

In order to enable the pipes to be disconnected between the cars by a person stationed on one of the platforms, I attach one end of a chain, V, to each lever K and secure the other end of the chain to one of the sleeves T, or to any other suitable object. By grasping the chain, the handle or lever may be operated without the necessity of going between the cars, and in the event that the car-coupling between the cars should break the pipes A in straightening out would draw the chains V tight and cause the said chains to operate the lever K and trip the hooks G, and thereby disconnect the pipes between the cars and prevent the same from being injured.

Having thus described my invention, I claim—

1. The flexible pipes for railroad-cars, having the coupling members C at their meeting ends, each member being provided with a flange, F, and the pairs of ears D E, in combination with the hooks G, adapted to engage said flanges and having arms H, and the levers K, pivoted between the ears E and having the openings through which the hook-arms extend, and thereby adapted to trip the said hooks, substantially as described.

2. In a pipe-coupling, the combination of the member C, having the flange F, the hook G, pivoted to said member and having the rearwardly-extending arm H, provided with the spring I, and the lever K, pivoted to the member and having the opening through which the arm H extends and with which the spring engages, substantially as described.

In testimony that I claim the foregoing as my own I have hereto affixed my signature in presence of two witnesses.

JAMES I. COLLINS.

Witnesses:
L. A. SERVISS,
JNO. F. COLLINS.